United States Patent
Ng et al.

(10) Patent No.: US 7,742,431 B2
(45) Date of Patent: Jun. 22, 2010

(54) SELECTIVELY SENDING LINK STATE MESSAGES IN A NETWORK LINK STATE PROTOCOL BASED ON INTEREST OF NETWORK NODES

(75) Inventors: Sandy Ng, Milpitas, CA (US); Gargi Nalawade, San Jose, CA (US); Steven V. Luong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 872 days.

(21) Appl. No.: 11/023,292

(22) Filed: Dec. 22, 2004

(65) Prior Publication Data

US 2006/0133298 A1 Jun. 22, 2006

(51) Int. Cl.
*H04L 12/28* (2006.01)

(52) U.S. Cl. .................................. 370/254; 370/410

(58) Field of Classification Search ............... 370/351, 370/338, 252, 236, 238, 254, 506, 354, 240, 370/400, 410, 401, 469; 709/242, 469
See application file for complete search history.

(56) References Cited

U.S. PATENT DOCUMENTS

| | | | |
|---|---|---|---|
| 6,349,091 B1 * | 2/2002 | Li | 370/238 |
| 6,606,325 B1 * | 8/2003 | Cain | 370/410 |
| 6,711,152 B1 * | 3/2004 | Kalmanek et al. | 370/351 |
| 6,757,258 B1 | 6/2004 | Pillay-Esnault | |
| 6,977,937 B1 * | 12/2005 | Weinstein et al. | 370/401 |
| 6,985,959 B1 * | 1/2006 | Lee | 709/238 |
| 7,200,122 B2 * | 4/2007 | Goringe et al. | 370/255 |
| 7,334,047 B1 * | 2/2008 | Pillay-Esnault | 709/242 |
| 7,359,404 B1 * | 4/2008 | Allan | 370/469 |
| 2003/0014540 A1 * | 1/2003 | Sultan et al. | 709/240 |
| 2003/0043820 A1 * | 3/2003 | Goringe et al. | 370/400 |
| 2003/0193901 A1 * | 10/2003 | Ishibashi | 370/252 |
| 2004/0028060 A1 * | 2/2004 | Kang | 370/400 |
| 2004/0120355 A1 * | 6/2004 | Kwiatkowski | 370/506 |
| 2004/0174825 A1 * | 9/2004 | Li et al. | 370/254 |
| 2005/0078656 A1 * | 4/2005 | Bryant et al. | 370/351 |
| 2005/0152333 A1 * | 7/2005 | Smith | 370/351 |
| 2005/0276251 A1 * | 12/2005 | Biddiscombe et al. | 370/338 |
| 2006/0072461 A1 * | 4/2006 | Luong et al. | 370/236 |
| 2006/0077909 A1 * | 4/2006 | Saleh et al. | 370/254 |

OTHER PUBLICATIONS

Cisco Press, "Appendix G- Which Routing Protocol?," *Optimal Routing Design*, ISBN 1587051877, 2005, located on the internet at <http://searchnetworking.techtarget.com/searchNetworking/Downloads/1587051877content.pdf>, pp. 458-469.

Bhatia, Manav, "A Comparative Study of OSPE and IS-IS," Samsung Electronics, Sep. 2002, located on the internet at <http://www.nada.kth.se/kurser/kth/2D1490/03/papers/Comparative_Study-of_OSPF_and ISIS.txt>, pp. 1-15.

* cited by examiner

*Primary Examiner*—Steven H Nguyen
*Assistant Examiner*—Awet Haile
(74) *Attorney, Agent, or Firm*—Hickman Palermo Truong & Becker LLP

(57) ABSTRACT

In a link state protocol such as an interior gateway protocol (IGP), link state advertisements or link state packets (LSA/LSPs) are sent only to network nodes that have expressed interest in them, rather than always flooding them.

19 Claims, 4 Drawing Sheets

SELECTIVELY SENDING LINK STATE MESSAGES IN A NETWORK LINK STATE PROTOCOL BASED ON INTEREST OF NETWORK NODES

FIELD OF THE INVENTION

The present invention generally relates to communication of messages in a link state protocol as used by nodes in a network. The invention relates more specifically to techniques for selectively sending link state messages rather than flooding them.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (often routers directing the packet along one or more of a plurality of links connected to it) according to one of various routing protocols. One such type of protocol is a link state routing protocol. A link state routing protocol requires each router to maintain the entire map of the network. When a network link changes state from active to inactive ("goes up" or "comes down") or the converse, a notification, often termed a link state advertisement (LSA) in Open Shortest Path First (OSPF) or link state packet (LSP) in Intermediate System-to-Intermediate System (IS-IS), is flooded throughout the network. All the routers that receive the message record the change and recompute their routes accordingly. Interior gateway protocols (IGPs) such as OSPF and IS-IS are examples of link state protocols.

In some link state routing protocols, Router Capabilities LSAs/LSPs are designed to carry application-specific information not related to IGP routes or topology. These LSAs/LSPs are flooded to all the nodes. However, some of the nodes in the system do not need the information contained in the Router Capabilities (RC) LSA/LSP. Sending the RC LSAs/LSPs to every node unnecessarily loads both the network and any node that does not need the information.

Such "unnecessary" messages include periodic RC LSA/LSP Refreshes which occur, for example, every thirty minutes for OSPF and every fifteen minutes for ISIS. A problem with flooding periodic LSA/LSP Refreshes is that the RC LSA/LSP Refreshes may not contain any new information and therefore, are unnecessarily burdening both the network and receiving nodes.

Even when new information is contained in an RC LSA/LSP the message is flooded to nodes that are not interested in the information. For example, when a tunnel endpoint floods the RC LSAs/LSPs carrying the tunnel endpoint information, the RC LSA/LSP is sent to all the nodes in the network, even though only those nodes that participate in the tunnel or are in the topology path of another tunnel endpoint may need to receive, or be interested in, the information.

Based on the foregoing, there is clearly a need for an approach to reduce the number of unnecessary messages sent by nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for controlling link state message flow for a node in a network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural Overview
 3.0 Functional Overview
  3.1 Example Processes for Selectively Sending Link State Messages
  3.2 Benefits and Examples
 4.0 Hardware Overview
 5.0 Extensions and Alternatives 1.0 General Overview The needs identified in the foregoing Background, and other needs and objects that will become apparent for the following description, are achieved in the present invention, which includes, in one aspect: in a link state protocol such as an interior gateway protocol, link state advertisements or link state packets (LSA/LSPs) are sent only to network nodes that have expressed interest in them, rather than always flooding them.

In another aspect, the invention provides, in a link state protocol that conventionally floods link state messages to all of a plurality of nodes in a network, a method of selectively sending the link state message, comprising receiving interest information for a receiver node in the network; determining that a sender node needs to send a link state message; and generating and sending a link state message from the sender node to the receiver node only if the interest information indicates that the receiver node is interested in the link state message.

In one feature, the interest information is in any one of a router capabilities message type of the link state protocol, a router capabilities link state advertisement of the link state protocol, or a router capabilities link state packet of the link state protocol. In another feature, generating and sending the link state message comprises determining, based on the interest information, whether the receiver node is capable of interpreting a message of the same type as the link state message.

In yet another feature, the determining step further comprises determining, based on the interest information, whether the sender node is configured to receive messages conforming to the link state protocol used for the link state message. The link state protocol can be an Interior Gateway Protocol such as Open Shortest Path First or Intermediate System-to-Intermediate System.

Generating and sending the link state message may comprise determining, based on the interest information, whether the receiver node has expressed an interest in a particular type of link state information carried in the link state message. The particular type of link state information may comprise a change in router capabilities for routers in a particular network tunnel.

Further, generating and sending the link state message can comprise determining, based on the first set of interest information, whether the receiver node is in a particular group of routers. Additionally, generating and sending the link state message comprises determining whether the receiver node is part of a network tunnel.

In still another feature, generating and sending the link state message to the sender node comprises determining, based on the first set of interest information, whether the receiver node is on a path to a certain router in a particular group of routers, such as two or more nodes in a network tunnel. The link state message corresponds to any one of a change in state for the receiver node, a change in router capability for the receiver node, a change in configuration for the receiver node, a change in tunnel configuration for the receiver node, or a change in ability to receive a particular type of message. The method also may comprise altering the interest information based on the link state message.

2.0 Structural Overview

Figure 1A:
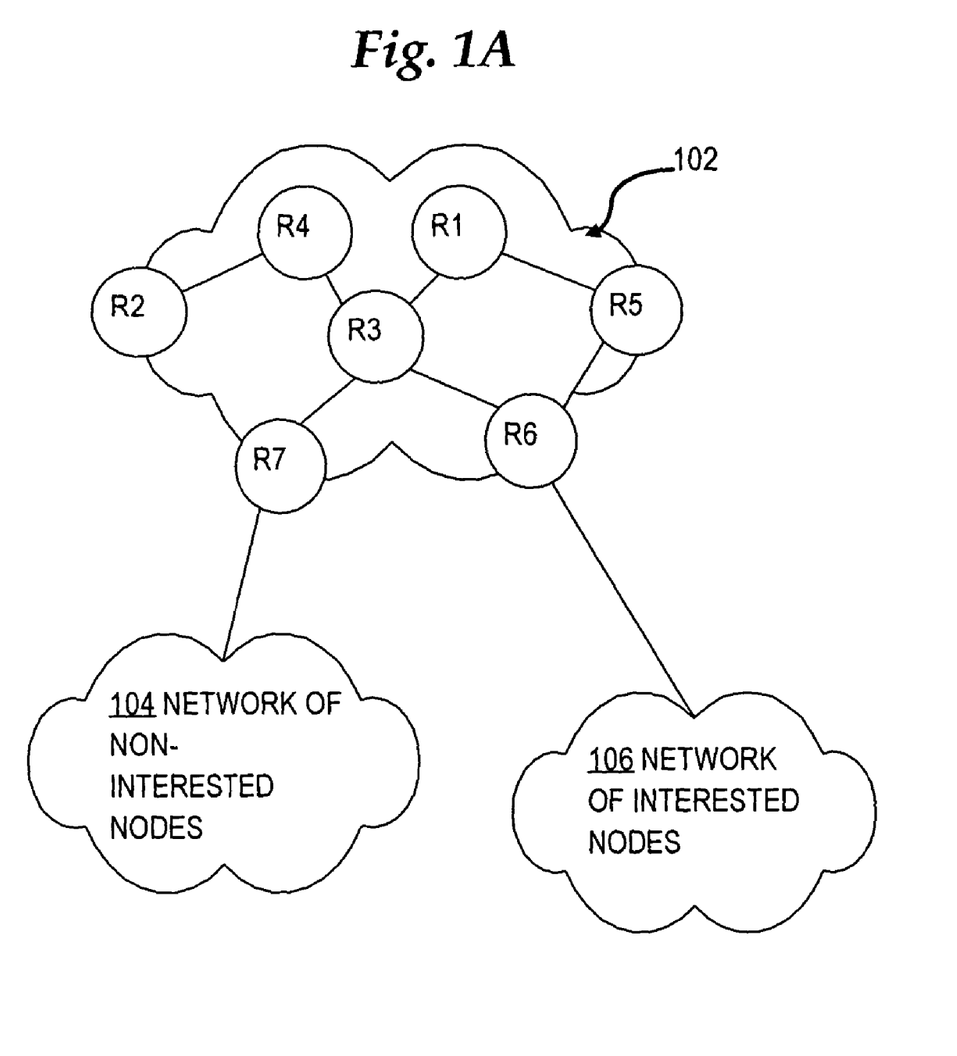
FIG. 1A is a block diagram that depicts an example network in which an embodiment can be used.

FIG. 1A is a block diagram that depicts an example network in which an embodiment can be used. A first network 102 comprises a plurality of interconnected nodes R1, R2, R3, R4, R5, R6, R7. When network 102 is a packet-switched network, each of the nodes R1-R7 may comprise a router, switch, line card, or other network infrastructure element that runs Interior Gateway Protocol (IGP). The nodes R1-R7 may be communicatively coupled to one another according to any topology.

Nodes R1-R7 may comprise one or more nodes that are interested in an LSA/LSP that is sent by one of the nodes, and one or more nodes that are not interested. For example, assume that a change in capabilities occurs for node R4. Conventionally, node R4 floods a router capability change LSA/LSP to all nodes R1-R7 in network 102. However, not all the nodes R1-R7 may be interested in receiving that particular LSA/LSP. For example, node R6 may have no interest in a capability change for R4 because R6 can reach all other nodes through paths that do not pass through R4. Therefore, if R6 is has no interest in a particular capability of R4, there is no material effect on R6, because R6 can still communicate with all other nodes. According to the techniques herein, R4 selectively sends the capability change LSA/LSP only to nodes that have previously expressed interest in receiving an LSA/LSP from R4.

Network 102 also may have connectivity to one or more other networks 104, 106 that include interested or non-interested nodes.

The nodes R1-R7 may include interfaces for sending and receiving information to or from other nodes R1-R7 or other devices that are communicatively coupled to the nodes R1-R7. Each node R1-R7 includes a network information storage unit that may be implemented as a database, a flat file, a data structure in memory, or any other appropriate storage such as random access memory, read only memory, or a machine-readable medium as described in the section entitled Hardware Overview.

In one embodiment, the network information storage units of R1-R7 store adjacency information for nodes R1-R7. Adjacent nodes may be nodes that are directly physically coupled to one another. Alternatively, adjacent nodes may be logically coupled to one another. In one embodiment, routing-protocol packets are only sent and received among nodes R1-R7 via adjacencies. For example, in link state protocols, a node R1-R7 may send LSA/LSPs only to those other nodes R1-R7 that are "adjacent" to the sending node. Each node R1-R7 may send an LSA or LSP in order to provide information on the node's adjacencies; to specify the node's configuration to other nodes in the network; to indicate to other nodes R1-R7 when the node's state changes; or to indicate its router capabilities to the other nodes.

When a node R1-R7 receives LSAs with adjacency information, the network information storage units may be altered appropriately. Based on information in the network information storage units, which is generated at least in part from the received LSAs, each node R1-R7 may calculate a shortest-path tree, with itself as root. The shortest-path tree, in turn, yields a routing table. Examples of determining shortest path, generating LSAs, network information storage units, and link state networks are given in IETF RFC 2328, entitled "OSPF Version 2"; by J. Moy; April 1998.

Nodes R1-R7 are each logical machines. Each logical machine may run on separate physical computing machines or may be running on the same physical computing machine, router, switch, or line card as one or more of the other logical machines. Various embodiments of computers and other physical and logical machines are described in detail below in the section entitled Hardware Overview.

3.0 Functional Overview

Unless stated otherwise, the techniques described herein are described with respect to a particular link state protocol, Open Shortest Path First (OSPF). However, the techniques are in no way limited to this protocol. The techniques described herein may also be used with other link state protocols, such as the Intermediate System-to-Intermediate System (IS-IS) protocol, or any other interior gateway protocol (IGP).

In the examples below, a particular type of limited-interest message is discussed, a router capability message. A limited-interest message is a LSA/LSP in which fewer than all of the nodes in the network of nodes are interested. A router capability message is used to announce the abilities and configuration of routers in the network. As discussed below, fewer than all of the nodes in the network of nodes are interested in receiving particular router capability messages.

3.1 Example Processes for Selectively Sending Link State Messages

Figure 1B:
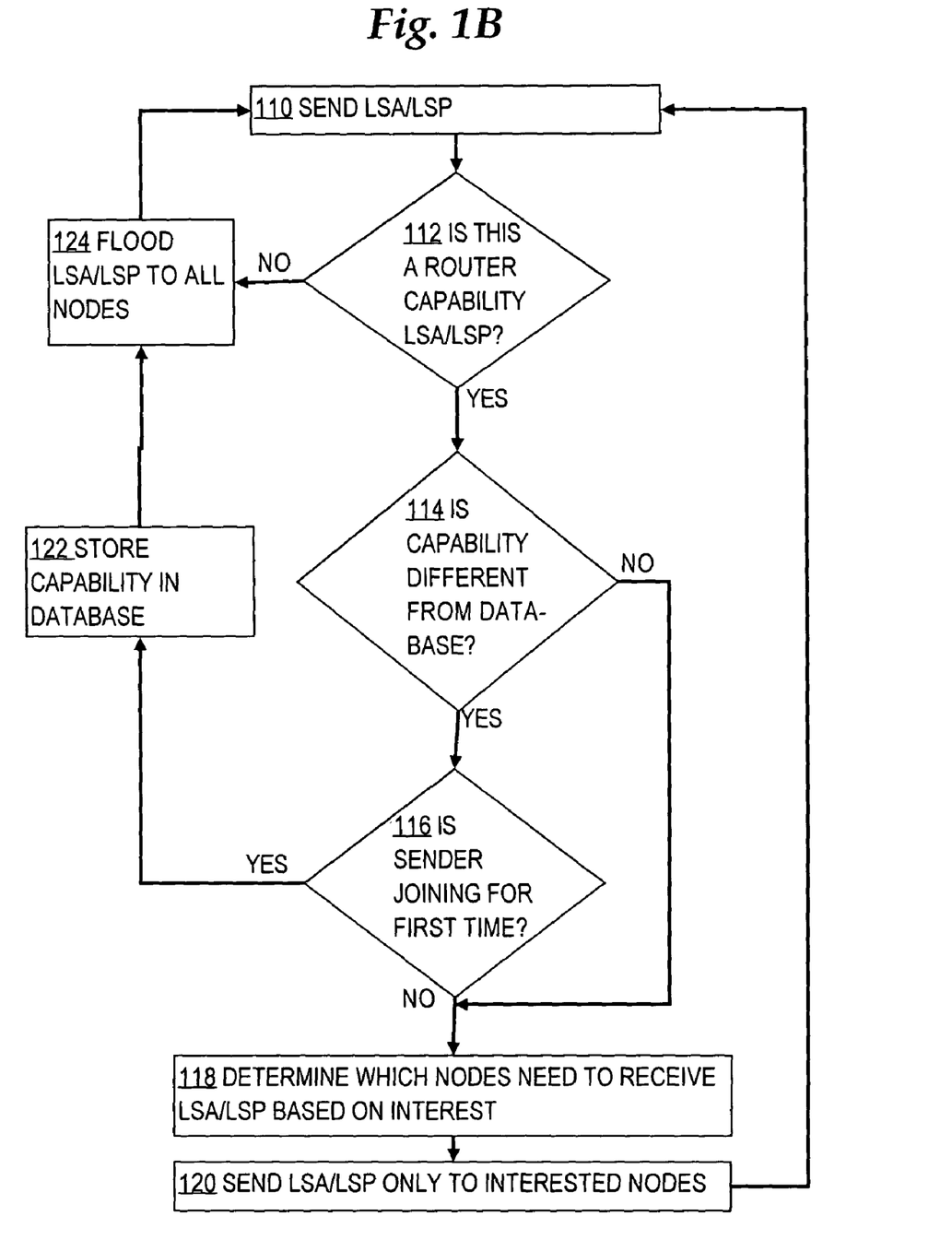
FIG. 1B is a flow diagram of an example process of selectively sending link state messages.

FIG. 1B is a flow diagram of an example process of selectively sending link state messages. In step 110 an LSA/LSP is sent, for example, by the IGP process of a router, switch, or other network infrastructure node. In step 112, a test is performed to determine if the LSA/LSP is a router capability type of LSA/LSP. If not, then in step 124, the LSA/LSP is flooded to all network nodes, as in conventional practice.

If the LSA/LSP is a router capability LSA/LSP, the control passes to step 114, in which a test is performed to determine whether the capability advertised in the LSA/LSP is different from a capability for the sending network node as shown in a database stored at the receiving network node. If a different capability is advertised in the LSA/LSP, then in step 116 a test is performed to determine if the sending router is joining the network topology or advertising its interest in the topology for the first time. Step 116 represents an exceptional case in which a router capability LSA/LSP may require flooding to the entire network. If step 116 has a true result, then in step 122, the different capability or new interest identified in steps 114, 116 is stored in the receiving node's database. Control passes to step 124 in which the LSA/LSP is flooded.

If the result of step 116 is false, then at step 118, the process determines which nodes need to receive the LSA/LSP based on a previously expressed interest of the nodes. Techniques for expressing interest and determining which nodes should receive the LSA/LSP are described further below. At step 120, the LSA sent only to the interested nodes. Thus, FIG. 1B provides, in a link state protocol, an approach in which link state advertisements or link state packets (LSA/LSPs) are sent only to network nodes that have expressed interest in them, rather than always flooding them.

Figure 2:
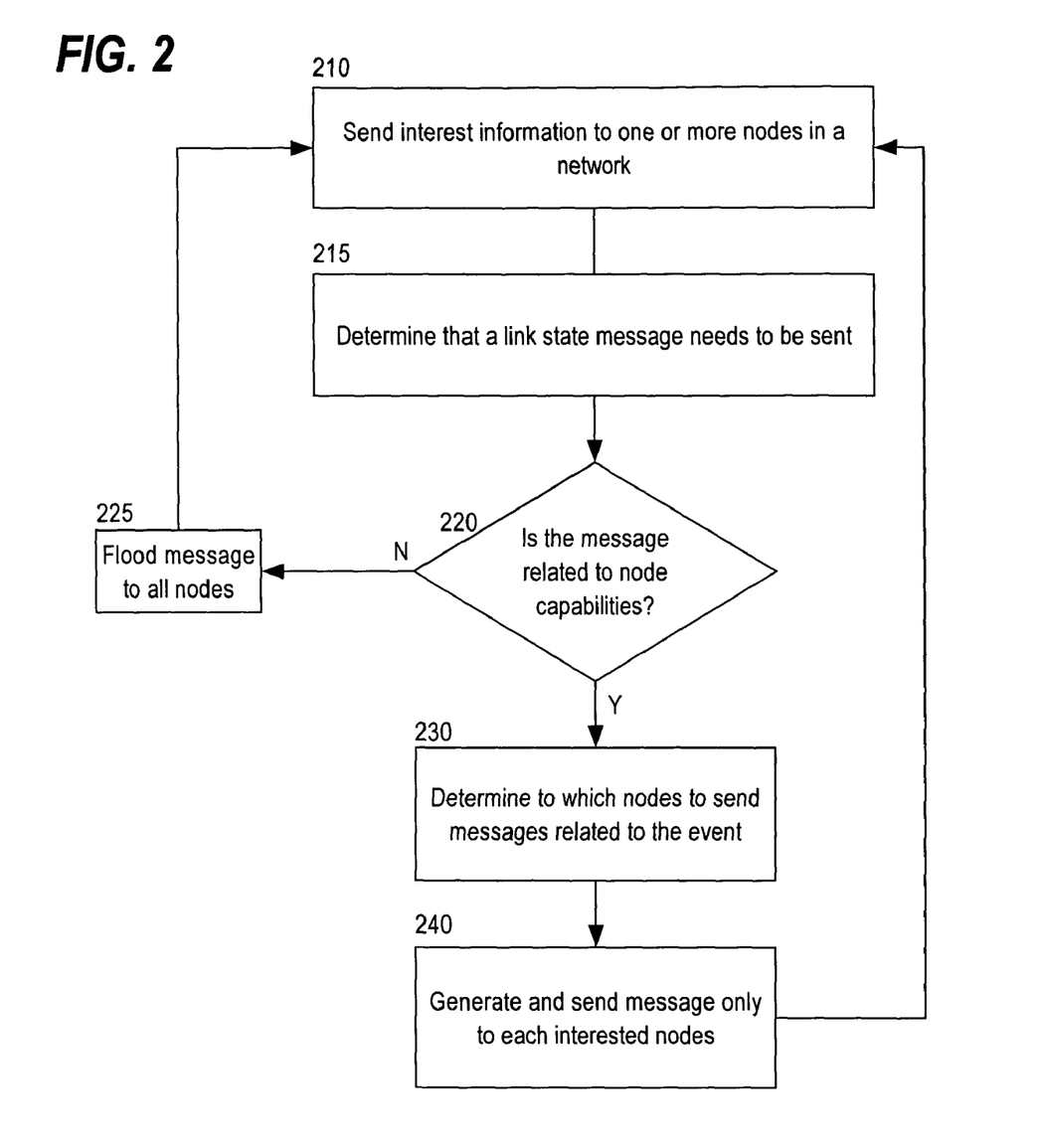
FIG. 2 is a flowchart that depicts another example process for selectively sending link state messages in a network.

FIG. 2 is a flowchart that depicts another example process for selectively sending link state messages in a network. Beginning the process of FIG. 2 may comprise physically connecting a given node to one or more other nodes, having one or more nodes established as adjacent nodes for one or more other nodes, sending or receiving one or more LSAs/LSPs to or from one or more of other nodes, or any other appropriate action.

In step 210, a node sends interest information related to one or more nodes in the network. The interest information may be contained in an LSA, an LSP, or in any appropriate message in any appropriate protocol. The interest information may include a change in link state, such as adjacency, for a node in the network; a change in configuration for a node; or a change in ability to receive a particular type of message, for example if a node begins to or discontinues accepting messages of a particular protocol. The information received may also include a change in router capabilities for nodes in the network. Router capabilities may include changes in adjacency information, changes in participation in a tunnel or inclusion in a particular group of nodes, changes in a node's interest in a tunnel or a particular group of nodes, or any other appropriate router capability information. Router capabilities may also include neighbor or adjacency information, tunnel security keys, Internet Protocol Version 6 (IPV6) tunnel information, or Generic Routing Protocol (GRE) tunnel information. The interest information may also contain information announcing that a particular node is interested in a particular type of router capabilities message.

Some of the configuration information sent in step 210 provides interest information indirectly. For example, configuration information that specifies that a particular node is included in a tunnel may indicate that the particular node is interested in message related to that tunnel. The information sent in step 210 may be interpreted and stored in a network information storage unit. For example, in the context of FIG. 1, a node R1 receives an LSA from a neighbor node R3 via its adjacency. The LSA contains router capability information related to node R3 changing its adjacency information. The node R1 stores the information in its network information storage unit.

Through this example is described in terms of the performance of the techniques at a particular node, step 210 (and all steps) may be performed by one or more of nodes R1-R7. Additionally, one or more processes communicatively coupled to the particular node may perform the techniques described herein. Each node R1-R7 may receive messages at any time and may perform step 210 each time a message is received and may do so concurrently with the performance of steps 215-240. The information received in step 210 may comprise, in aggregate, a snapshot of the current adjacencies in the network, the capabilities of the nodes in the network, and a representation of which nodes are interested in which types of router capabilities events and information.

In step 215, it is determined that the node needs to send a LSA/LSP. The content of the LSA/LSP may have been generated based on changes in configuration or router capabilities of the node, or it may be based on one or more messages received at the node from other nodes in the network. The LSA/LSP may be any message in any link state protocol the node is capable of sending. For example, a node R1 may determine that a LSA/LSP should be sent based on messages received in step 210 or elsewise. A node R1 may also initiate the LSA/LSP based on the configuration or abilities of the node itself. For example, if a node R1 is capable of doing multi-protocol label switching (MPLS) constrained shortest path first (SPF) calculations, it may also initiate a LSA/LSP, in the context of step 215, and flood the message indicating the ability to perform the SPF calculation may to a select set of nodes (as described below).

In one embodiment, step 215 is performed after step 210. Alternatively, step 210 may be performed continuously and step 215 may be performed whenever a LSA/LSP needs to be sent on the network. In one embodiment, step 215 is performed continually or continuously.

In step 220, a check is performed to determine whether the LSA/LSP that needs to be sent is a router capabilities message (or, in general, a limited-interest message). The router capabilities message may convey information about any appropriate event, including, but not limited to: a change in router capabilities for a particular node in the network; a particular node joining or leaving a particular group of nodes, such as a tunnel; a particular node being added to or removed from the network; a particular node has failing; a particular node being able to or not being able to receive a particular type of message, where that information was not previously known; or a particular node being interested in receiving information about a particular type of router capability message.

If the LSA/LSP is not a router capabilities message, then in step 225, the message is generated and flooded to all the nodes. For example, a node R1 may determine as part of step 220 that the LSA/LSP should be broadcasted to all nodes in node R1's scope. In step 225, the node R1 generates the LSA/LSP and broadcasts it to a multicast address corresponding to all nodes in the node R1's scope. The message then arrives at all nodes (e.g., R3, R5) in the scope of node R1. Furthermore, as an example, in the context of FIG. 1, the flooding of LSA/LSPs from a node R1 to the other nodes R2-R7 may be performed via the adjacencies of those nodes. After flooding the message in step 225, step 210 is performed.

If the LSA/LSP is a router capabilities message, then in step 230, a determination of which nodes are interested in the message is made. The determination may be made by comparing (A) the type of router capabilities message (as described above), the content of the router capabilities message, and/or the node or nodes to which the router capabilities message pertains to (B) information in the interest information storage unit. Since information related to the nodes is received in step 210 and stored in the network information storage unit, the network information storage unit may contain information useful in determining which nodes are interested in which router capabilities messages. Only if a particular node is interested in a particular type of router capabilities message is a message constructed for and sent to that particular node (see step 240).

A particular node may be determined as "interested" in a particular router capabilities message if the router capabilities message relates to a particular tunnel or group of nodes in which the particular node is participating or in which the particular node has expressed an interest. It may also be determined that the router capabilities message should be sent to a particular node if the particular node is on the path to another particular node that is participating in or has expressed an interest in the particular tunnel or group of nodes.

An example of step 230, in the context of the example in step 215 and FIG. 1, is a software unit executing on a node R1, the software unit determining that the node only needs to send an indication that it can perform constrained SPF calculations to a particular set of nodes that have expressed an interested in having another node perform the constrained SPF calculations for them. The node R1 then sends a message that indicates that it can perform constrained SPF calculations directly to those nodes via TCP/IP. Since the other nodes have not expressed an interest in the particular router capabilities message, the message is not sent to those other nodes.

In step 240, messages are generated and sent to each node that is interested in the router capabilities message. Step 240 may comprise generating a single message and sending it to each other node that is interested in the message; generating part of a message that is common to all of the messages to be sent to each node that is interested in the router capabilities message and subsequently generating a separate message containing the common portion of the message for each interested node; or generating a separate message for each interested node. The messages are then sent to each interested node, and step 210 is performed.

The messages generated and sent as part of step 240 may be sent to a unicast address corresponding to the interested node via Transmission Control Protocol (TCP)/Internet Protocol (EP); Universal Datagram Protocol (UDP); or any other appropriate protocol. One way the messages generated and sent as part of step 240 may be sent, in OSPF, is by simulating virtual OSPF adjacency between two tunnel endpoints and flooding of the LSAs targeted to the tunnel endpoint neighbors. In this embodiment, LSA updates may be flooded/forwarded directly to a tunnel neighbor via the virtual adjacency. Furthermore, OSPF may intrinsically implement reliable flooding through the LSA retransmission/acknowledgment mechanism. This mechanism may ensure OSPF neighbors receive the message.

Each of steps 210-240 may be performed by one or more software or logic units on a node or on one or more devices communicatively coupled to a node. Additionally, the steps 210-240 are depicted in FIG. 2 as being performed in a particular order. The techniques described herein are in no way limited to that particular order. Steps 210-240 may be performed in a different order and one or more of steps 210-240 may not be performed. For example, in one embodiment, step 210 is performed continually in one thread or process on a node and steps 215-240 are performed in the given order on another thread or process on the node, and the threads or processes performing step 210 and the thread or process performing steps 215-240 are performed concurrently. It is also possible that if no LSA/LSP is to be sent (determined as part of step 215), then step 210 may again be performed. Additionally, after a message has been generated and sent (step 240 or step 225), then step 215 may be performed instead of step 210.

3.2 Benefits and Examples

Various embodiments of the techniques described herein each provide one or more benefits over prior approaches. For example, after determining that the LSA/LSP that is to be sent (step 215) is a router capabilities message (step 220), Router Capabilities LSAs/LSPs are generated and sent in step 240 to the interested nodes determined in step 230. Selectively flooding RC LSAs/LSPs may be beneficial if there are a limited number of nodes that are "interested in" or need to receive the RC LSAs/LSPs since the selective flooding may reduce the burden on the network and the nodes in the network. Selective flooding of RC LSAs/LSPs may be a good application of the techniques described herein as RC LSAs/LSPs may contain information in which only a subset of the nodes in the network are interested.

In another embodiment, there may no longer be a need for periodic RC LSA/LSP Refreshes, which are typically performed every thirty minutes for OSPF and every fifteen minutes for IS-IS. Various embodiments of the techniques described herein may be implemented such that, only when there are detected changes in a node's router capability, will a related RC LSA/LSP be sent.

Various embodiments of the techniques described herein enable flooding RC LSAs/LSPs which result from changes in the LSA/LSP content to only the node or nodes which are interested in the information. For example, a tunnel endpoint may need to flood the LSAs/LSPs carrying the endpoint information to only those nodes that are in the topology path of another tunnel endpoint node interested in participating in the advertised tunnel (including the endpoint node itself).

The embodiments described herein may be used alone or in combination with broadcast methods. For example, a node may implement an embodiment of the techniques described herein for certain LSA/LSP or types of LSA/LSPs, such as router capabilities messages, and may do a full scope or partial scope broadcast based on other LSA/LSPs. For example, the node may flood a message to the full scope of nodes when it announces its interest in a topology or when a node leaves a topology, but may use selective flooding techniques described herein or when there has been a change to an RC LSA/LSP.

In one embodiment, nodes may announce their desire to be a part of a particular topology and announce that they are interested in information related to the topology flooding by flooding an RC LSA/LSP to other nodes, where the RC LSA/LSP contains a Topology Identifier corresponding to the particular topology. The other nodes in the network will then store this information in their network information storage units.

A node, upon receiving an RC LSA/LSP related to the particular topology (as part of step 210), will determine from information in its network information storage unit (as part of step 230) and determine the set of nodes to which to forward the RC LSA/LSP as those nodes which: 1) have announced that they participate in the particular topology by advertising this Topology Identifier; or 2) fall in the path to a node that has announced an interested in the particular topology corresponding to the Topology Identifier, but they themselves do not participate in the topology.

The node may then flood the RC LSA/LSP to only the nodes in the above created set (as part of step 240).

Specific examples of Router Capabilities LSAs/LSPs are used herein for illustrative purposes only. The techniques described herein are not limited to a particular type or types of Router Capability LSAs/LSPs nor to Router Capabilities information. The techniques may be used for any messages that may be flooded to less than the full scope of nodes on a network.

4.0 Hardware Overview

Figure 3:
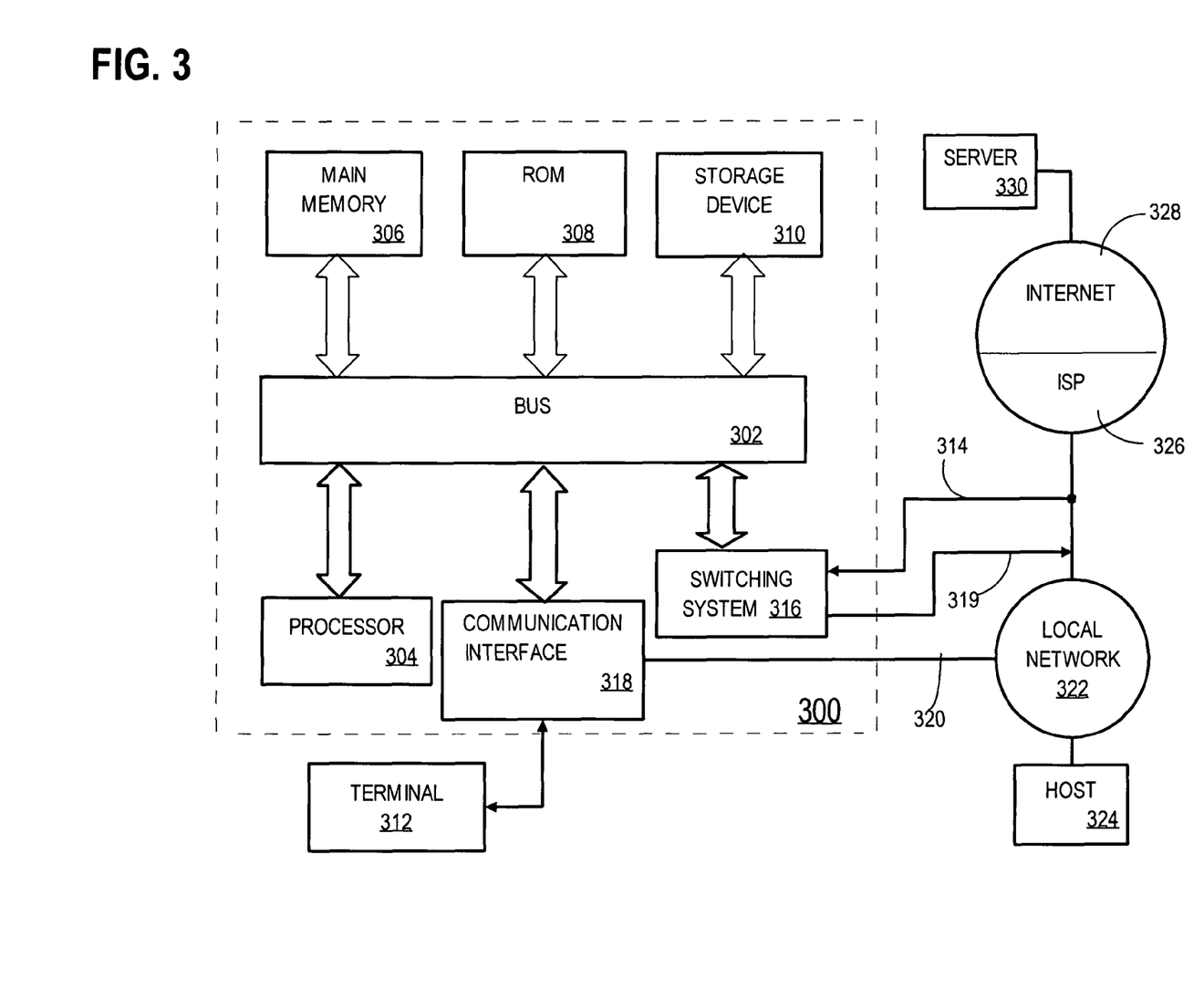
FIG. 3 is a block diagram that illustrates a computer system with which an embodiment of the invention may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for selectively sending link state messages such as LSA/LSPs in a network link state protocol based on interest of network nodes. According to one embodiment of the invention, selectively sending link state messages such as LSA/LSPs in a network link state protocol based on interest of network nodes is provided by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 304 for execution. Such a medium may take many forms, including, but not limited to, non-volatile media, and volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for selectively sending link state messages such as LSA/LSPs in a network link state protocol based on interest of network nodes as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a link state protocol that conventionally floods link state advertisements or link state packets ("LSA/LSPs") to all of a plurality of nodes in a network, a method of selectively sending the LSA/LSP, comprising:

prior to receiving interest information, collecting from a first node, storing in a storage unit and updating in the storage unit, expressed-interest data indicating in which type of two or more types of LSA/LSP interest information messages and from which routers the first node is interested in;

receiving the interest information from a third node for the first node in the network;

determining that a second node needs to send a LSA/LSP; and determining whether the first node is interested in the interest information by comparing the type of the interest information message in the interest information with the expressed-interest data that was received from the first node;

generating the LSA/LSP comprising the interest information, and sending the LSA/LSP from the second node to the first node only if the first node expressed interest in receiving the interest information and in receiving the interest information from the third node;

wherein the interest information is in any one of a router capabilities message type of the link state protocol, a router capabilities link state advertisement of the link state protocol, or a router capabilities link state packet of the link state protocol;

wherein generating and sending the LSA/LSP comprises determining, based on the interest information, whether the first node has expressed an interest in a particular type of link state information carried in the LSA/LSP;

wherein the particular type of link state information comprises a change in router capabilities for routers in a particular network tunnel;

wherein the method is performed at the second node.

2. The method of claim 1, wherein generating and sending the LSA/LSP comprises determining, based on the interest information, whether the first node is capable of interpreting a message of the same type as the LSA/LSP.

3. The method of claim 2, wherein the determining step further comprises determining, based on the interest information, whether the second node is configured to receive messages conforming to the link state protocol used for the LSA/LSP.

4. A method as recited in claim 1, wherein the link state protocol is an interior gateway protocol comprising Open Shortest Path First protocol or Intermediate System-to-Intermediate System protocol.

5. The method of claim 1, wherein generating and sending the LSA/LSP comprises determining, based on a first set of interest information, whether the first node is in a particular group of routers.

6. The method of claim 5, wherein generating and sending the LSA/LSP comprises determining whether the first node is part of a network tunnel.

7. The method of claim 5, wherein generating and sending the LSA/LSP to the second node comprises determining, based on the first set of interest information, whether the first node is on a path to a certain router in a particular group of routers.

8. The method of claim 7, wherein the particular group of routers comprises two or more nodes in a network tunnel.

9. The method of claim 1, wherein the LSA/LSP corresponds to any one of a change in state for the first node, a change in router capability for the first node, a change in configuration for the first node, a change in tunnel configuration for the first node, or a change in ability to receive a particular type of message.

10. The method of claim 1, further comprising altering the interest information based on the LSA/LSP.

11. A non-transitory machine-readable volatile or non-volatile medium storing one or more sequences of instructions for controlling link state message flow for a first node in a network of nodes, which instructions cause one or more processors to carry out the steps of:

prior to receiving interest information, collecting from the first node, storing in a storage unit and updating in the storage unit, expressed-interest data indicating in which type of two or more types of LSA/LSP interest information messages and from which routers the first node is interested in;

receiving a first set of interest information from a third node for the first node in the network of nodes;

determining that a second node needs to send a link state message;

determining whether the link-state message corresponds to a limited-interest link state message type, wherein the limited-interest link state message type corresponds to one or more messages which a subset of nodes in the network of nodes are interested in receiving;

if the link-state message corresponds to the limited-interest link state message type, then determining, based on the first set of interest information and the link state message, whether to send the link state message to the first node by comparing the type of the interest information message in the interest information with the expressed-interest data that was received from the first node; generating a particular link state message based on the link state message only if the first node expressed interest in receiving the interest information and in receiving the interest information from the third node; sending the particular link state message to the first node; and if the link-state message does not correspond to the limited-interest link state message type, then generating and flooding a second particular link state message to all nodes in the network of nodes;
wherein the interest information is in any one of a router capabilities message type of the link state protocol, a router capabilities link state advertisement of the link state protocol, or a router capabilities link state packet of the link state protocol;
wherein generating and sending the particular link state message comprises determining, based on the interest information, whether the first node has expressed an interest in a particular type of link state information carried in the particular link state message;
wherein the particular type of link state information comprises a change in router capabilities for routers in a particular network tunnel;
wherein all the steps are performed at the second node.

12. The machine-readable volatile or non-volatile medium of claim 11, wherein the limited-interest link state message type corresponds to a router capabilities message type.

13. The machine-readable volatile or non-volatile medium of claim 11, wherein the link-state message corresponds to a change in link state for the first node.

14. An apparatus for controlling link state message flow for a first node in a network of nodes, comprising:
a network interface that is coupled to a data network for receiving one or more packet flows therefrom;
a processor;
one or more stored sequences of instructions that cause the processor to carry out the steps of:
prior to receiving interest information, collecting from a first node, storing in a storage unit and updating in the storage unit, expressed-interest data indicating in which type of two or more types of LSA/LSP interest information messages and from which routers the first node is interested in;
receiving a first set of interest information from a third node for the first node in the network of nodes;
determining that a second node needs to send a link state message;
determining whether the link-state message corresponds to a limited-interest link state message type, wherein the limited-interest link state message type corresponds to one or more messages which a subset of nodes in the network of nodes are interested in receiving;
if the link-state message corresponds to the limited-interest link state message type, then determining, based on the first set of interest information and the link state message, whether to send the link state message to the first node by comparing the type of the interest information message in the interest information with the expressed-interest data that was received from the first node; generating a particular link state message based on the link state message only if the first node expressed interest in receiving the interest information and in receiving the interest information from the third node; sending the particular link state message to the first node and if the link-state message does not correspond to the limited-interest link state message type, then generating and flooding a second particular link state message to all nodes in the network of nodes;
wherein the interest information is in any one of a router capabilities message type of the link state protocol, a router capabilities link state advertisement of the link state protocol, or a router capabilities link state packet of the link state protocol;
wherein generating and sending the particular link state message comprises determining, based on the interest information, whether the first node has expressed an interest in a particular type of link state information carried in the particular link state message;
wherein the particular type of link state information comprises a change in router capabilities for routers in a particular network tunnel;
wherein all the steps are performed at the second node.

15. The apparatus of claim 14, wherein the limited-interest link state message type corresponds to a router capabilities message type.

16. The apparatus of claim 14, wherein the link-state message corresponds to a change in link state for the first node.

17. An apparatus for controlling link state message flow for a first node in a network of nodes, comprising:
one or more processors;
means for collecting, and storing in a storage unit, expressed-interest data received from a first node, indicating in which type of two or more types of LSA/LSP interest information messages and from which routers the first node is interested in prior to receiving interest information;
means for receiving a first set of interest information from a third node for first node in the network of nodes;
means for determining that a second node needs to send a link state message;
means for determining whether the link-state message corresponds to a limited-interest link state message type, wherein the limited-interest link state message type corresponds to one or more messages which a subset of nodes in the network of nodes are interested in receiving;
means for, if the link-state message corresponds to the limited-interest link state message type, then determining, based on the first set of interest information and the link state message, whether to send the link state message to the first node by comparing the type of the interest information message in the interest information with the expressed-interest data that was received from the first node; generating a particular link state message based on the link state message only if the first node expressed interest in receiving the interest information and in receiving the interest information from the third node; sending the particular link state message to the first node; and
means for, if the link-state message does not correspond to the limited-interest link state message type, then generating and flooding a second particular link state message to all nodes in the network of nodes;
wherein the interest information is in any one of a router capabilities message type of the link state protocol, a router capabilities link state advertisement of the link state protocol, or a router capabilities link state packet of the link state protocol;
wherein generating and sending the particular link state message comprises determining, based on the interest information, whether the first node has expressed an interest in a particular type of link state information carried in the particular link state message;
wherein the particular type of link state information comprises a change in router capabilities for routers in a particular network tunnel;
wherein the means are in the second node.

18. The apparatus of claim 17, wherein the limited-interest link state message type corresponds to a router capabilities message type.

19. The apparatus of claim 17, wherein the link-state message corresponds to a change in link state for the first node.

* * * * *